United States Patent
Futamase (10) Patent No.: US 8,923,848 B2
(45) Date of Patent: Dec. 30, 2014

(54) TELEPHONE SWITCH, CALL PICK-UP METHOD THEREFOR, CALL PICK-UP PROGRAM THEREFOR, AND TELEPHONE SYSTEM

(75) Inventor: Yasuhito Futamase, Kanagawa (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/131,456

(22) PCT Filed: Mar. 22, 2012

(86) PCT No.: PCT/JP2012/057401
§ 371 (c)(1),
(2), (4) Date: Jan. 8, 2014

(87) PCT Pub. No.: WO2013/011716
PCT Pub. Date: Jan. 24, 2013

(65) Prior Publication Data
US 2014/0141771 A1 May 22, 2014

(30) Foreign Application Priority Data
Jul. 21, 2011 (JP) ................. 2011-159894

(51) Int. Cl.
*H04W 4/00* (2009.01)
*H04M 3/02* (2006.01)
*H04M 3/42* (2006.01)
*H04M 1/738* (2006.01)

(52) U.S. Cl.
CPC ............ *H04M 3/02* (2013.01); *H04M 3/42212* (2013.01); *H04M 1/738* (2013.01); *H04M 2203/1091* (2013.01)
USPC ..................... 455/426.2; 455/554.1; 455/555; 455/560; 379/212.01

(58) Field of Classification Search
USPC ........ 455/426.2, 554.1, 555, 560; 379/212.01
See application file for complete search history.

(56) References Cited

U.S. PATENT DOCUMENTS

2007/0121862 A1 * 5/2007 Fuse ............................ 379/161

FOREIGN PATENT DOCUMENTS

| JP | 8-140141 A | 5/1996 |
|---|---|---|
| JP | 9-322255 A | 12/1997 |

(Continued)

OTHER PUBLICATIONS

International Search Report for PCT Application No. PCT/JP2012/057401, mailed on May 15, 2012.

(Continued)

*Primary Examiner* — Justin Lee
(74) *Attorney, Agent, or Firm* — Sughrue Mion, PLLC (57) ABSTRACT

Provided is a telephone switch such that an incoming call to an extension within the telephone switch can be picked up from a mobile terminal. The telephone switch includes: a receiving dial table which registers dial data that a mobile terminal uses to pick up an incoming call to a fixed-line telephone connected to the telephone switch; a conversion dial table which registers a call pick-up number used within the telephone switch for carrying out call pick-up of an incoming call to the fixed-line telephone; and a dial conversion unit configured such that when dial data sent by the mobile terminal is received when there is an incoming call to a fixed-line telephone, the dial conversion unit determines whether or not the received dial data sent from the mobile terminal matches the dial data in the receiving dial table, and if the dial data match, converts the received dial data to a call pick-up number in the conversion dial table such that the incoming call to the fixed-line telephone is picked up from the mobile terminal.

7 Claims, 3 Drawing Sheets

(56) References Cited

FOREIGN PATENT DOCUMENTS

| | | |
|---|---|---|
| JP | 2000-187224 A | 7/2000 |
| JP | 2006-67244 A | 3/2006 |
| JP | 2006-157975 A | 6/2006 |
| JP | 2007-174003 A | 7/2007 |
| JP | 2008-160257 A | 7/2008 |
| JP | 2008-187224 A | 8/2008 |
| JP | 2009-21769 A | 1/2009 |
| JP | 2010-273075 A | 12/2010 |
| JP | 2011-66575 A | 3/2011 |

OTHER PUBLICATIONS

Japanese Office Action for JP Application No. 2011-159894 mailed on Jan. 7, 2013 with English Translation.

* cited by examiner

TELEPHONE SWITCH, CALL PICK-UP METHOD THEREFOR, CALL PICK-UP PROGRAM THEREFOR, AND TELEPHONE SYSTEM

This application is a National Stage Entry of PCT/JP2012/057401 filed Mar. 22, 2012, which claims priority from Japanese Patent Application 2011-159894 filed Jul. 21, 2011, the contents of all of which are incorporated herein by reference, in their entirety.

TECHNICAL FIELD

The present invention relates to a telephone switch, a call pick-up method therefor, a call pick-up program therefor, and a telephone system, and in particular to a telephone switch in which an incoming call to an extension telephone is picked up from a mobile terminal, a call pick-up method therefor, a call pick-up program therefor, and a telephone system.

BACKGROUND ART

In general, as regards telephone switches such as PBXs (Private Branch eXchanges) accommodating a plurality of extension telephone sets and key telephone devices, the function of call pick-up is known. When there is an incoming call to an extension telephone set, the function of call pick-up makes it possible to give a response by deputy from another extension telephone set that is not called.

In a kind of this call pick-up function, an incoming call to an extension telephone set is picked up by dialing a special service code from another extension telephone set belonging to the same call pick-up group which is previously set. In another kind of the call pick-up function, an incoming call to an extension telephone set is picked up by dialing a special service code and a group number of a call pick-up group to which the called extension telephone set belongs, from another extension telephone set belonging to another call pick-up group. In addition, in another kind of the call pick-up function, an incoming call to an extension telephone set is picked up by dialing a special service code and an extension number of the called extension telephone set from another extension telephone set regardless of the call pick-up group. In this way, there are various kinds in the call pick-up function.

On the other hand, in a known system using a telephone switch in recent years, linking between fixed telephones and mobile telephones (hereafter referred to as "FMC linking") such as, for example, an operation of calling a mobile telephone of an employee who is out with an extension number is conducted by using a technique of FMC (Fixed Mobile Convergence) which merges fixed telephones and mobile telephones.

In case of employees who are out of the enterprise in many hours such as employees in a business department in enterprises introducing such a telephone switch, it is conceivable that a fixed telephone is not provided on a desk of the employee and the employee uses a mobile terminal (hereafter referred to as "FMC linking terminal" for convenience) such as a mobile telephone capable of conducting FMC linking with a telephone switch not only outside the enterprise but also within the enterprise.

In a case where an employee who possesses only an FMC linking terminal picks up an incoming call in the system at that time, it is considered that the employee picks up the call from a fixed telephone of another employee because it is impossible to pick up the call from the FMC linking terminal. This is inconvenient in operation.

In connection with this, PTL 1 states that extension numbers and IP addresses of portable IP telephone sets are recorded in an extension number management table in an IP extension telephone system including portable IP (Internet Protocol) telephone sets such as mobile terminals coping with wireless LAN (Local Area Network). In addition, PTL 1 states that extension numbers are recorded in association with groups corresponding to segments of IP addresses, in this IP extension telephone system. According to this, it is said that portable IP telephone sets can be included in call pick-up groups and an incoming call in the IP extension telephone system can be picked up from a portable IP telephone set.

CITATION LIST

Patent Literature

{PTL 1}JP-A-2000-187224

SUMMARY OF INVENTION

Technical Problem

In a system conducting FMC linking, an incoming call in a telephone switch cannot be picked up from an FMC linking terminal accommodated in the telephone switch and it is only possible to pick up an incoming call in the telephone switch from a fixed telephone accommodated in the telephone switch. In this case, a worker possessing only an FMC linking terminal uses a fixed telephone of another person and feels inconvenience in operation.

In the IP telephone extension system stated in PTL 1, an incoming call to a fixed telephone set is picked up from a mobile terminal via an extension. In this case, an incoming call to an extension telephone set in the telephone switch cannot be picked up from a mobile terminal conducting FMC linking via an outside line.

An object of the present invention is to solve the above-described problems and provide a telephone switch in which an incoming call to an extension telephone set in a telephone switch can be picked up from a mobile terminal, a call pick-up method therefor, a call pick-up program therefor, and a telephone system.

Solution to Problem

According to a first viewpoint of the present invention, there is provided a telephone switch comprising: a receiving dial table in which dial data to be used when picking up an incoming call to a fixed telephone set connected to the telephone switch from a mobile terminal is registered; a conversion dial table in which a call pick-up number to be used in the telephone switch when picking up an incoming call to the fixed telephone set is registered; and a dial conversion unit configured to, when dial data sent from the mobile terminal is received when there is an incoming call to the fixed telephone set, determine whether the received dial data coincides with the dial data in the receiving dial table, and when both the dial data coincide with each other, convert the received dial data to the call pick-up number in the conversion dial table to pick up the incoming call to the fixed telephone set from the mobile terminal.

According to a second viewpoint of the present invention, there is provided a call pick-up method in telephone switch, comprising: registering dial data to be used when picking up an incoming call to a fixed telephone set connected to the telephone switch from a mobile terminal, into a receiving dial table; registering a call pick-up number to be used in the telephone switch when picking up an incoming call to the fixed telephone set, into a conversion dial table; and in a dial conversion unit, when dial data sent from the mobile terminal is received when there is an incoming call to the fixed telephone set, determining whether the received dial data coincides with the dial data in the receiving dial table, and when both the dial data coincide with each other, converting the received dial data to the call pick-up number in the conversion dial table to pick up the incoming call to the fixed telephone set from the mobile terminal.

According to a third viewpoint of the present invention, there is provided a program for call pick-up in telephone switch that causes a computer to function as a telephone switch comprising: a receiving dial table in which dial data to be used when picking up an incoming call to a fixed telephone set connected to the telephone switch from a mobile terminal is registered; a conversion dial table in which a call pick-up number to be used in the telephone switch when picking up an incoming call to the fixed telephone set is registered; and a dial conversion unit configured to, when dial data sent from the mobile terminal is received when there is an incoming call to the fixed telephone set, determine whether the received dial data coincides with the dial data in the receiving dial table, and when both the dial data coincide with each other, convert the received dial data to the call pick-up number in the conversion dial table to pick up the incoming call to the fixed telephone set from the mobile terminal.

Advantages Effects of the Invention

According to the present invention, an incoming call to an extension telephone set in a telephone switch can be picked up from a mobile terminal.

REFERENCE SINGS LIST

1 Telephone network
2 Telephone switch
3 Same premise
11 Mobile telephone corporation network
12 IP telephone network
21 Dial conversion unit
31 FMC linking terminal (mobile terminal)
32 Fixed telephone set
211 Receiving dial table
212 Conversion dial table
213 Conversion table

DESCRIPTION OF EMBODIMENTS

Hereafter, embodiments of a telephone switch and a call pick-up method therefor according to the present invention will be described in detail with reference to the drawings.

Figure 1:
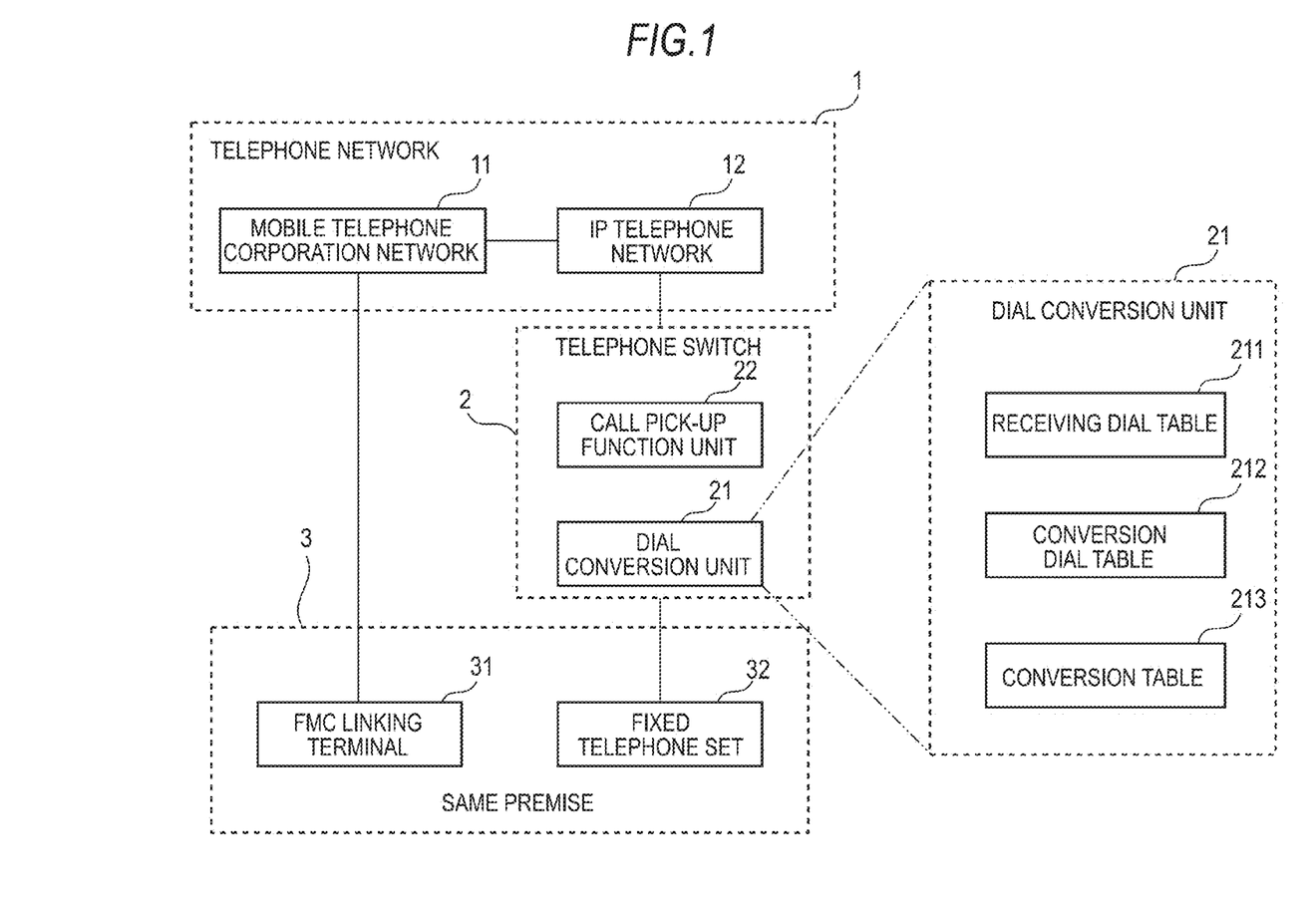
FIG. 1 A block diagram illustrates a general configuration of a telephone system using a telephone switch according to an embodiment of the present invention.

With reference to FIG. 1, a telephone system using a telephone switch according to the present embodiment includes a telephone network 1 used for communication of terminals, a telephone switch 2, a fixed telephone set 32, and an FMC linking terminal 31. The telephone network 1 includes a mobile telephone corporation network 11 and an IP telephone network 12. The telephone switch 2 is connected to the telephone network 1, and operates under program control. The fixed telephone set 32 is connected to the telephone switch 2. The FMC linking terminal 31 exists in the same premise as the fixed telephone set 32 does.

The FMC linking terminal 31 is formed of a mobile terminal such as, for example, a mobile telephone set or a smart phone provided by a mobile telephone corporation, and connected to the telephone switch 2 via the telephone network 1 (the mobile telephone corporation network 11 and the IP telephone network 12). This FMC linking terminal 31 can conduct FMC linking with the telephone switch 2 connected thereto via an outside line. For example, the telephone switch 2 has a conversion table (not illustrated) or the like capable of converting a telephone number and an extension number of the FMC linking terminal 31 to each other. And the telephone switch 2 conducts operation such as conversion of an extension number that is input from the fixed telephone set 32 to a telephone number of the FMC linking terminal 31 by using the conversion table. No matter where the FMC linking terminal 31 is located, therefore, the FMC linking terminal 31 can be called from the fixed telephone set 32 by using the extension number. In addition, in the present embodiment, the FMC linking terminal 31 allows an operation for picking up an incoming call to the fixed telephone set 32 in the same premise 3 via an outside line (the telephone network 1).

The telephone switch 2 is, for example, a PBX (private branch exchange), a key telephone device, a key telephone system, or the like. Functionally, the telephone switch can accommodate a plurality of extension telephone sets (fixed telephone sets). The telephone switch 2 is formed of, for example, a computer (controller) including a CPU (Central Processing Unit) which operates under program control and a memory (ROM (Read Only Memory)/RAM (Random Access Memory) which stores the control program and various control data. The telephone switch 2 includes a port connected to the telephone network 1 and a port connected to the fixed telephone set 32. The telephone switch 2 connects the telephone network 1 and the fixed telephone set 32 to each other and connects the fixed telephone set 32 and another fixed telephone set to each other via the ports, and conducts operations such as incoming call processing.

In the present embodiment, the telephone switch 2 has a function of picking up an incoming call to the fixed telephone set 32 from the FMC linking terminal 31 via an outside line (the telephone network 1), besides a function of picking up an incoming call to the fixed telephone set 32 from another fixed telephone set 32 having no incoming call via an extension. This call pick-up function is implemented by processing operations in a dial conversion unit 21 and a call pick-up function unit 22.

The dial conversion unit 21 includes a receiving dial table 211 and a conversion table 213. Furthermore, the dial conversion unit 21 may include a conversion table 213 for converting data in the receiving dial table 211 to data in the conversion dial table 212. In the present embodiment, the dial conversion unit 21 can operate under program control in the telephone switch 2.

Dial data that is sent from the FMC linking terminal 31 when picking up an incoming call to the fixed telephone set 32 in the same premise 3 from the FMC linking terminal 31 and that can be received via an outside line (the telephone network 1) and can be used for call pick-up is registered in the receiving dial table 211. As this dial data, for example, dial data using a special service code to be used in call pick-up can be utilized.

A call pick-up number to be used in the telephone switch 2 when picking up an incoming call in the telephone switch 2 is registered in the conversion dial table 212. As this call pick-up number, for example, a call pick-up number using a special service code to be used in call pick-up can be utilized.

In a case where the method of picking up an incoming call to an extension telephone set by dialing a special service code from another extension telephone set belonging to the same call pick-up group which is previously set is adopted, the fixed telephone set 32 and the FMC linking terminal 31 are previously registered in the same call pick-up group. In addition to that, an extension number corresponding to the FMC linking terminal 31 is previously registered as a call pick-up number registered in the conversion dial table 212.

Also in a case where the method of picking up an incoming call to an extension telephone set by dialing a special service code and an extension number of the called extension telephone set from another extension telephone set is adopted, an extension number corresponding to the FMC linking terminal 31 is previously registered as a call pick-up number registered in the conversion dial table 212.

Figure 2:
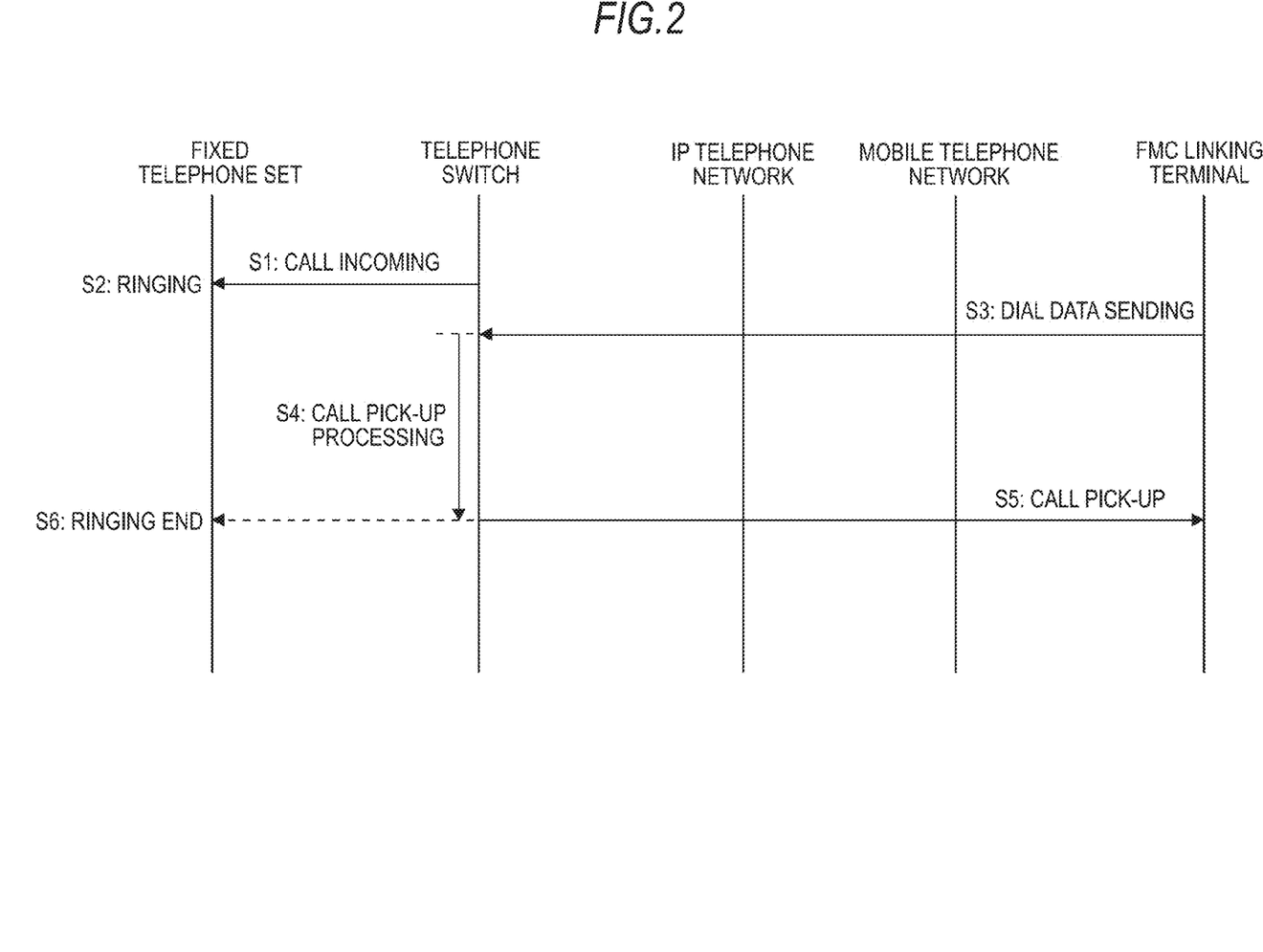
FIG. 2 A sequence diagram describes an operation of the telephone switch illustrated in FIG. 1.

Operation in the present embodiment will now be described in detail with reference to FIG. 2 and FIG. 3.

First, as previous setting, dial data to be used in call pick-up are set in the receiving dial table 211 and the conversion dial table 212 in the dial conversion unit 21. In other words, dial data to be sent from the FMC linking terminal 31 when picking up an incoming call from the FMC linking terminal 31 is set in the receiving dial table 211 as described above. Furthermore, a call pick-up number to be used in the telephone switch 2 when picking up an incoming call in the telephone switch 2 is set in the conversion dial table 212. In addition, correspondence relations between data in the receiving dial table 211 and data in the conversion dial table 212 are set in the conversion table 213.

Then, it is supposed that the FMC linking terminal 31 and the fixed telephone set 32 are located in the same premise 3. Here, an incoming call arrives at the fixed telephone set 32 via the telephone switch 2 as shown in FIG. 2 (step S1), and calling (ringing) processing is conducted (step S2). In a state in which there is an incoming call to the fixed telephone set 32, an operation for picking up the incoming call from the FMC linking terminal 31, i.e., a dial depressing operation corresponding to dial data previously registered in the receiving dial table 211 is conducted. And the FMC linking terminal 31 sends the dial data (step S3).

In a case where the telephone switch 2 has received the dial data sent from the FMC linking terminal 31 via the telephone network 1 (the mobile telephone corporation network 11 and the IP telephone network 12), call pick-up processing is conducted in the dial conversion unit 2 (step S4). A flow of this processing is illustrated in FIG. 3.

Figure 3:
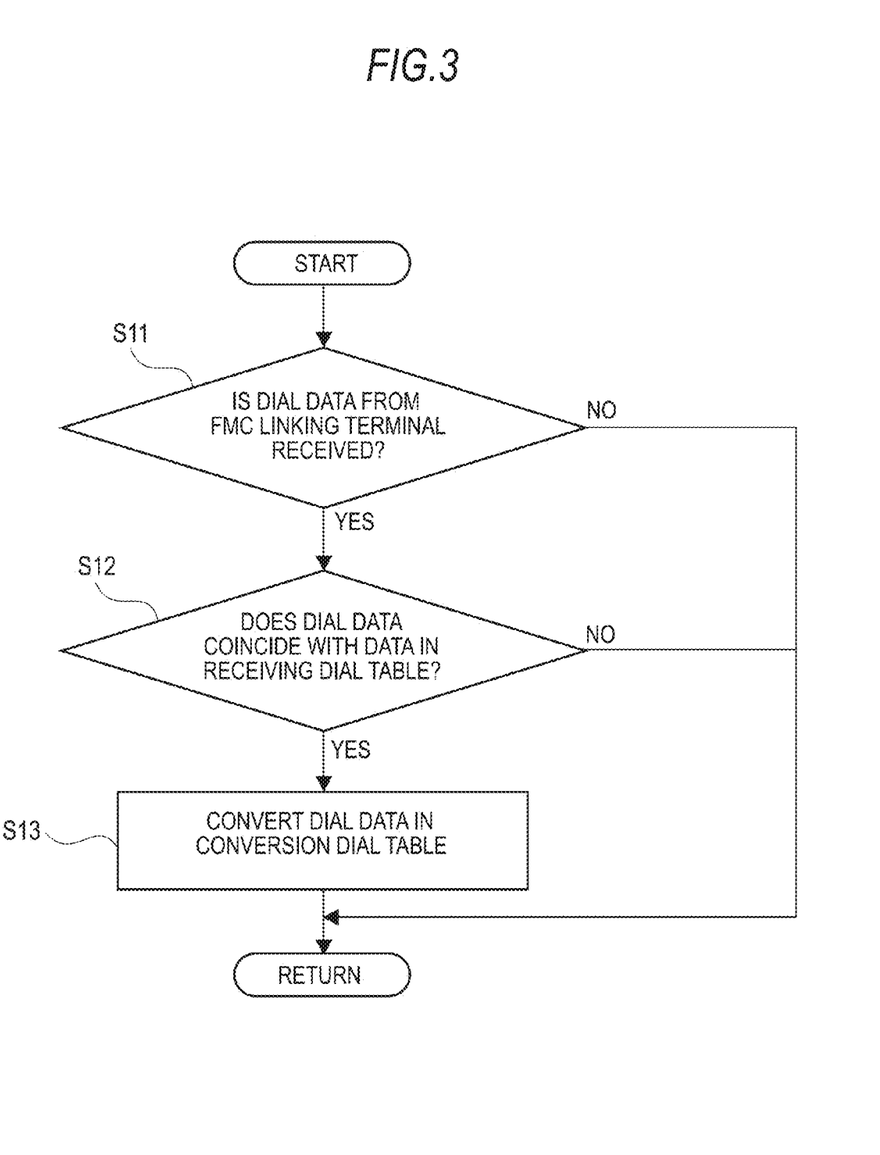
FIG. 3 A flow chart describes an operation of the telephone switch illustrated in FIG. 1.

As illustrated in FIG. 3, the telephone switch 2 receives the dial data sent from the FMC linking terminal 31 (step S11: YES). Subsequently, it is determined by processing in the dial conversion unit 21 whether the received dial data coincides with some dial data registered in the receiving dial table 211 (step S12). In a case where coincidence is found as a result of the determination at the step S12 (step S12: YES), the received dial data is converted to a call pick-up number registered in the conversion dial table 212 (step S13). At the time of the conversion, the conversion table 213 may be set to be referred to. And the call pick-up number is specified and the call pick-up function unit 22 included in the telephone switch 2 is started. The call pick-up function unit 22 associates a number of the fixed telephone set 32 with a call pick-up number of the FMC linking terminal 31 (the call pick-up function unit 22 may conduct the association previously). An incoming call to the fixed telephone set 32 is switched to an incoming call to the FMC linking terminal 31 by utilizing this association.

As a result, it becomes possible to pick up the incoming call to the fixed telephone set 32 from the FMC linking terminal 31 by conducting conversion to the call pick-up number used in the telephone switch 2 in the state in which there is the incoming call to the fixed telephone set 32 (step S5). At this time point, the ringing processing of the fixed telephone set 32 is also finished (step S6).

In a case where an incoming call arrives at the fixed telephone set 32 in the present embodiment, therefore, dial data already registered in the receiving dial table 211 in the dial conversion unit 21 is depressed at the FMC linking terminal 31. And the dial data is sent to the dial conversion unit 21 in the telephone switch 2 via the mobile telephone corporation network 11 and the IP telephone network 12, and the dial data is converted to the call pick-up number registered in the conversion dial table 212 by the dial conversion unit 21 in the telephone switch 2. In the present embodiment, therefore, it becomes possible to pick up an incoming call to the fixed telephone set 32 from the FMC linking terminal 31.

Furthermore, in the present embodiment, it becomes possible to pick up an incoming call to the fixed telephone set 32 in the same premise 3 via an outside line from the FMC linking terminal 31. In this case, an outside line is used. Since an outside line talk charge of the FMC linking terminal 31 includes only a fixed charge, however, a measured rate charge does not occur.

In addition, most employees in business departments are expected to work outside the corporations for many hours. In that case, it is considered that the employee does not have a fixed telephone set 32 on the own seat and mainly uses the FMC linking terminal 31 (mobile telephone). In this case, it becomes possible to pick up a call without using the fixed telephone set 32 of another person by utilizing the function of the call pick-up function and performing a call pick-up operation from the FMC linking terminal 31 owned by the employee when the employee has returned to the corporation.

In the present embodiment, the tables (the receiving dial table 211 and the conversion dial table 212) prepared in the telephone switch 2 are used from the FMC linking terminal 31 provided by a mobile telephone corporation as described heretofore. As a result, it is made possible in the present embodiment to pick up an incoming call in the telephone switch 2. In other words, in the present embodiment, the receiving dial table 211 and the conversion dial table 212 that make call pick-up from the FMC linking terminal 31 possible are created in the telephone switch 2. In a case where there is an incoming call in the telephone switch 2, call pick-up from the FMC linking terminal 31 becomes possible by depressing a preset dial.

In the present embodiment, therefore, the following effects can be brought about.

As a first effect, it becomes possible even for a worker who possesses only the FMC linking terminal 31 to pick up an incoming call in the system.

As a second effect, call pick-up becomes possible not at the fixed telephone set 32 but at the FMC linking terminal 31 and consequently movement after the call pick-up becomes possible.

As a third effect, the operation cost can be held down by using the FMC linking terminal 31 because a talk charge does not occur except a fixed charge for the FMC linking terminal 31.

In PTL 1 described above, an incoming call to a fixed telephone is picked up from a mobile terminal via an extension. In this case, an incoming call to an extension telephone set in the telephone switch cannot be picked up from a mobile terminal that conducts FMC linking. In the present embodiment, however, an incoming call to the fixed telephone set 32 in the telephone switch 2 can be picked up via an outside line by operating the FMC linking terminal 31, which is a mobile terminal (outside line terminal) conducting FMC linking with the telephone switch 2.

By the way, as another embodiment, it becomes possible to conduct call pick-up not only from the FMC linking terminal 31 but also from another mobile terminal such as a mobile telephone that does not conduct FMC linking with the telephone switch 2.

Furthermore, the above-described telephone switch can be implemented by using hardware, software, or a combination of them. A configuration using hardware, software, or a combination of them in this case is not especially restricted, but any form can be applied as long as the above-described function can be implemented.

Furthermore, "the above-described function can be implemented by using software" means "the above-described function can be implemented by a computer which reads and executes a program for causing the computer to execute the method." The program is stored by using non-transitory computer readable media of various types and the program can be supplied to the computer. The non-transitory computer readable media include tangible storage media of various types. Examples of the non-transitory computer readable medium include a magnetic recording medium (for example, a flexible disk, magnetic tape, and a hard disk drive), a magneto-optical recording medium (for example, an optical magnetic disk), a CD-ROM (Read Only Memory), a CD-R, a CD-R/W, and a semiconductor memory (for example, a mask ROM, a PROM (Programmable ROM), an EPROM (Erasable PROM), a flash ROM, and a RAM (random access memory)). Furthermore, the program may be supplied to the computer by transitory computer readable media of various types. Examples of the transitory computer readable medium include an electric signal, an optical signal, and electromagnetic waves. The transitory computer readable medium can supply the program to the computer via a wire communication path such as an electric wire and an optical fiber, or a wireless communication path.

The present application is based upon Japanese Patent Application 2011-159894 (filed on Jul. 21, 2011), and claims priority in the treaty of Paris based on Japanese Patent Application 2011-159894. Contents disclosed in Japanese Patent Application 2011-159894 are claimed in the present specification by referring to Japanese Patent Application 2011-159894.

A representative embodiment of the present invention has been described in detail. However, it should be appreciated that various changes, substitutions and alternatives can be made without departing from the spirit and scope of the invention defined in claims. Furthermore, the present inventor intends that the equivalent scope of the claimed invention is maintained even if claims are corrected in application procedures.

A part or all of the above-described embodiment can also be stated in the following appendixes. However, the embodiment is not restricted to them.

(Appendix 1) A telephone switch comprising: a receiving dial table in which dial data to be used when picking up an incoming call to a fixed telephone set connected to the telephone switch from a mobile terminal is registered; a conversion dial table in which a call pick-up number to be used in the telephone switch when picking up an incoming call to the fixed telephone set is registered; and a dial conversion unit configured to, when dial data sent from the mobile terminal is received when there is an incoming call to the fixed telephone set, determine whether the received dial data coincides with the dial data in the receiving dial table, and when both the dial data coincide with each other, convert the received dial data to the call pick-up number in the conversion dial table to pick up the incoming call to the fixed telephone set from the mobile terminal.

(Appendix 2) The telephone switch according to appendix 1, wherein dial data that is sent from the mobile terminal and that can be received via an outside line is registered in the receiving dial table.

(Appendix 3) The telephone switch according to appendix 1 or 2, wherein the dial data registered in the receiving dial table uses a preset special service code.

(Appendix 4) The telephone switch according to any one of appendixes 1 to 3, wherein the call pick-up number uses a preset special service code.

(Appendix 5) The telephone switch according to any one of appendixes 1 to 4, wherein the mobile terminal conducts FMC (Fixed Mobile Convergence) linking with the telephone switch.

(Appendix 6) A call pick-up method in telephone switch, comprising: registering dial data to be used when picking up an incoming call to a fixed telephone set connected to the telephone switch from a mobile terminal, into a receiving dial table; registering a call pick-up number to be used in the telephone switch when picking up an incoming call to the fixed telephone set, into a conversion dial table; and in a dial conversion unit, when dial data sent from the mobile terminal is received when there is an incoming call to the fixed telephone set, determining whether the received dial data coincides with the dial data in the receiving dial table, and when both the dial data coincide with each other, converting the received dial data to the call pick-up number in the conversion dial table to pick up the incoming call to the fixed telephone set from the mobile terminal.

(Appendix 7) The call pick-up method in telephone switch according to appendix 6, wherein dial data that is sent from the mobile terminal and that can be received via an outside line is registered in the receiving dial table.

(Appendix 8) The call pick-up method in telephone switch according to appendix 6 or 7, wherein the dial data registered in the receiving dial table uses a preset special service code.

(Appendix 9) The call pick-up method in telephone switch according to any one of appendixes 6 to 8, wherein the call pick-up number uses a preset special service code.

(Appendix 10) The call pick-up method in telephone switch according to any one of appendixes 6 to 9, wherein the mobile terminal conducts FMC (Fixed Mobile Convergence) linking with the telephone switch.

(Appendix 11) A program for call pick-up in telephone switch that causes a computer to function as a telephone switch comprising: a receiving dial table in which dial data to be used when picking up an incoming call to a fixed telephone set connected to the telephone switch from a mobile terminal is registered; a conversion dial table in which a call pick-up number to be used in the telephone switch when picking up an incoming call to the fixed telephone set is registered; and a dial conversion unit configured to, when dial data sent from the mobile terminal is received when there is an incoming call to the fixed telephone set, determine whether the received dial data coincides with the dial data in the receiving dial table, and when both the dial data coincide with each other, convert the received dial data to the call pick-up number in the conversion dial table to pick up the incoming call to the fixed telephone set from the mobile terminal.

(Appendix 12) The program for call pick-up in telephone switch according to appendix 11, wherein dial data that is sent from the mobile terminal and that can be received via an outside line is registered in the receiving dial table.

(Appendix 13) The program for call pick-up in telephone switch according to appendix 11 or 12, wherein the dial data registered in the receiving dial table uses a preset special service code.

(Appendix 14) The program for call pick-up in telephone switch according to any one of appendixes 11 to 13, wherein the call pick-up number uses a preset special service code.

(Appendix 15) The program for call pick-up in telephone switch according to any one of appendixes 11 to 14, wherein the mobile terminal conducts FMC (Fixed Mobile Convergence) linking with the telephone switch.

(Appendix 16) A telephone system comprising a telephone switch according to any one of appendixes 1 to 5, and a mobile terminal connected to the telephone switch via an outside line, an incoming call in the telephone switch being picked up from the mobile terminal.

Heretofore, the invention of the present application has been described with reference to embodiments. However, the invention of the present application is not restricted to the embodiments. The configuration and details of the invention of the present application can be provided with various changes that can be appreciated by those skilled in the art within the scope of the invention of the present application.

INDUSTRIAL APPLICABILITY

As described heretofore, the present invention can be utilized for use such as a telephone switch accommodating a plurality of extension telephone sets, such as a PBX (private branch exchange), a key telephone device, and a key telephone system, a call pick-up method therefor, and a call pick-up program therefor. In particular, the present invention can be utilized for use such as a telephone switch using an FMC linking terminal, a method for call pick-up from the FMC linking terminal therefore, and a call pick-up program therefor.

What is claimed is:

1. A telephone switch connected to both of an extension for connecting devices included in a network on premises and an outside line for connecting devices through a network outside the premises, the telephone switch comprising:
a receiving dial table in which dial data to be used when picking up, from a mobile terminal, an incoming call to a fixed telephone set connected to the telephone switch via the extension is registered, the mobile terminal being connected to the telephone switch via the outside line;
a conversion dial table in which a call pick-up number to be used in the telephone switch when picking up an incoming call to the fixed telephone set is registered;
a dial conversion unit configured to, when dial data sent from the mobile terminal via the outside line is received when there is an incoming call to the fixed telephone set, determine whether the received dial data coincides with the dial data in the receiving dial table, and when both the dial data coincide with each other, and convert the received dial data to the call pick-up number in the conversion dial table; and
a call pick-up function unit configured to enable the mobile terminal to pick up, via the outside line, the incoming call to the fixed telephone set by using the call pick-up number for switching of the incoming call.

2. The telephone switch according to claim 1, wherein the dial data registered in the receiving dial table uses a preset special service code.

3. The telephone switch according to claim 1, wherein the call pick-up number uses a preset special service code.

4. The telephone switch according to claim 1, wherein the mobile terminal conducts FMC (Fixed Mobile Convergence) linking with the telephone switch.

5. A telephone system comprising a telephone switch according to claim 1, and the mobile terminal being connected to the telephone switch via an outside line, an incoming call in the telephone switch being picked up from the mobile terminal.

6. A call pick-up method in a telephone switch connected to both of an extension for connecting devices included in a network on premises and an outside line for connecting devices through a network outside the premises, the method comprising:
registering dial data to be used when picking up, from a mobile terminal, an incoming call to a fixed telephone set connected to the telephone switch via the extension, into a receiving dial table, the mobile terminal being connected to the telephone switch via the outside line;
registering a call pick-up number to be used in the telephone switch when picking up an incoming call to the fixed telephone set, into a conversion dial table;
in a dial conversion unit, when dial data sent from the mobile terminal via the outside line is received when there is an incoming call to the fixed telephone set, determining whether the received dial data coincides with the dial data in the receiving dial table, and when both the dial data coincide with each other, and converting the received dial data to the call pick-up number in the conversion dial table; and
in a call pick-up function unit, enabling the mobile terminal to pick up, via the outside line, the incoming call to the fixed telephone set by using the call pick-up number for switching of the incoming call.

7. A program for call pick-up in a telephone switch that causes a computer to function as a telephone switch, the computer being connected to both of an extension for connecting devices included in a network on premises and an outside line for connecting devices through a network outside the premises, the telephone switch comprising:
a receiving dial table in which dial data to be used when picking up, from a mobile terminal, an incoming call to a fixed telephone set connected to the telephone switch via the extension is registered, the mobile terminal being connected to the telephone switch via the outside line;
a conversion dial table in which a call pick-up number to be used in the telephone switch when picking up an incoming call to the fixed telephone set is registered;
a dial conversion unit configured to, when dial data sent from the mobile terminal via the outside line is received when there is an incoming call to the fixed telephone set, determine whether the received dial data coincides with the dial data in the receiving dial table, and when both the dial data coincide with each other, and convert the received dial data to the call pick-up number in the conversion dial table; and a call pick-up function unit configured to enable the mobile terminal to pick up, via the outside line, the incoming call to the fixed telephone set by using the call pick-up number for switching of the incoming call.

* * * * *